United States Patent
Lehar et al.

(10) Patent No.: US 8,778,545 B2
(45) Date of Patent: Jul. 15, 2014

(54) RECIRCULATION COMPLEX FOR INCREASING YIELD FROM FUEL CELL WITH CO₂ CAPTURE

(75) Inventors: Matthew Alexander Lehar, Munich (DE); Andrew Philip Shapiro, Schenectady, NY (US); Bruce Philip Biederman, Old Greenwich, CT (US); Vitali Victor Lissianski, Schenectady, NY (US); Andrew Maxwell Peter, Saratoga Springs, NY (US); Matthew Joseph Alinger, Albany, NY (US); Laura Michele Hudy, Waterford, NY (US); Roger Allen Shisler, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 519 days.

(21) Appl. No.: 13/076,664

(22) Filed: Mar. 31, 2011

(65) Prior Publication Data

US 2012/0251898 A1 Oct. 4, 2012

(51) Int. Cl.
*H01M 8/00* (2006.01)
(52) U.S. Cl.
USPC .......................................................... 429/400
(58) Field of Classification Search
USPC .......................................................... 429/428
See application file for complete search history.

(56) References Cited

U.S. PATENT DOCUMENTS

| 6,309,770 | B1 | 10/2001 | Nagayasu et al. |
| 7,553,568 | B2 | 6/2009 | Keefer |
| 2005/0214609 | A1 | 9/2005 | McElroy |
| 2006/0115691 | A1* | 6/2006 | Hilmen et al. ................. 429/13 |
| 2008/0090113 | A1 | 4/2008 | Keefer et al. |
| 2010/0215566 | A1 | 8/2010 | Lourenco et al. |

FOREIGN PATENT DOCUMENTS

| JP | 2008287941 A | 11/2008 |
| WO | 02078109 A1 | 10/2002 |

OTHER PUBLICATIONS

Search Report and Written Opinion from corresponding PCT Application No. PCT/US2012/031133 dated Jul. 18, 2012.

* cited by examiner

*Primary Examiner* — Ula C Ruddock
*Assistant Examiner* — Jacob Marks
(74) *Attorney, Agent, or Firm* — Francis T. Coppa

(57) ABSTRACT

A system and method are provided for boosting overall performance of a fuel cell while simultaneously separating a nearly pure stream of $CO_2$ for sequestration or for use in generating electrical power to further increase overall efficiency of the process. The system and method employ a heat exchanger system configured to generate a stream of fuel that is returned to the inlet of the fuel cell anode with a higher molar concentration of carbon monoxide (CO) and hydrogen ($H_2$) fuel than was initially present in the fuel cell anode outlet.

8 Claims, 3 Drawing Sheets

RECIRCULATION COMPLEX FOR INCREASING YIELD FROM FUEL CELL WITH $CO_2$ CAPTURE

BACKGROUND

This invention relates generally to solid-oxide fuel cells (SOFCs), and more particularly to systems and methods for boosting overall performance of a solid-oxide fuel cell (SOFC) while simultaneously separating a nearly pure stream of $CO_2$ for sequestration or for use in generating electrical power to further increase overall efficiency of the process.

Fuel cells are electrochemical energy conversion devices that have demonstrated a potential for relatively high efficiency and low pollution in power generation. A fuel cell generally provides a direct current (dc) which may be converted to alternating current (ac) via for example, an inverter. The dc or ac voltage can be used to power motors, lights, and any number of electrical devices and systems. Fuel cells may operate in stationary, semi-stationary, or portable applications. Certain fuel cells, such as solid oxide fuel cells (SOFCs), may operate in large-scale power systems that provide electricity to satisfy industrial and municipal needs. Others may be useful for smaller portable applications such as for example, powering cars.

A fuel cell produces electricity by electrochemically combining a fuel and an oxidant across an ionic conducting layer. This ionic conducting layer, also labeled the electrolyte of the fuel cell, may be a liquid or solid. Common types of fuel cells include phosphoric acid (PAFC), molten carbonate (MCFC), proton exchange membrane (PEMFC), and solid oxide (SOFC), all generally named after their electrolytes. In practice, fuel cells are typically amassed in electrical series in an assembly of fuel cells to produce power at useful voltages or currents. Therefore, interconnect structures may be used to connect or couple adjacent fuel cells in series or parallel.

In general, components of a fuel cell include the electrolyte and two electrodes. The reactions that produce electricity generally take place at the electrodes where catalyst is typically disposed to speed the reactions. The electrodes may be constructed as channels, porous layers, and the like, to increase the surface area for the chemical reactions to occur. The electrode that electrochemically reduces oxygen (typically from air) is referred to as the cathode, while the electrode that electrochemically oxidizes fuel is referred to as the anode. The electrolyte carries electrically charged particles from one electrode to the other and is otherwise substantially impermeable to both fuel and oxidant. In the case of a Solid Oxide Fuel Cell (SOFC), the electrolyte is a solid ceramic oxide that conducts negative oxygen ions at sufficiency high temperature (typically above 500 C). Because the electrolyte in an SOFC is only conductive at high temperature, the anode fuel inlet stream and the cathode oxidizer inlet stream must typically be preheated to high temperature (typically above 500 C). This preheating is typically accomplished via recuperative heat exchange with the hot fuel cell exhaust.

Typically, the fuel cell converts hydrogen (fuel) and oxygen (oxidant) into water (byproduct) to produce electricity. The byproduct water may exit the fuel cell as steam in high-temperature operations. This discharged steam (and other hot exhaust components) may be utilized in turbines and other applications to generate additional electricity or power, providing increased efficiency of power generation. If air is employed as the oxidant, the nitrogen in the air is substantially inert and typically passes through the fuel cell. Hydrogen fuel may be provided via local reforming (e.g., on-site steam reforming) of carbon-based feedstocks, such as reforming of the more readily available natural gas and other hydrocarbon fuels and feedstocks. Examples of hydrocarbon fuels include natural gas, methane, ethane, propane, methanol, syngas, and other hydrocarbons. The reforming of hydrocarbon fuel to produce hydrogen to feed the electrochemical reaction may be incorporated with the operation of the fuel cell. Moreover, such reforming may occur internal and/or external to the fuel cell. For reforming of hydrocarbons performed external to the fuel cell, the associated external reformer may be positioned remote from or adjacent to the fuel cell.

Fuel cell systems that can reform hydrocarbon internal and/or adjacent to the fuel cell may offer advantages, such as simplicity in design and operation. For example, the steam reforming reaction of hydrocarbons is typically endothermic, and therefore, internal reforming within the fuel cell or external reforming in an adjacent reformer may utilize the heat generated by the typically exothermic electrochemical reactions of the fuel cell. Furthermore, catalysts active in the electrochemical reaction of hydrogen and oxygen within the fuel cell to produce electricity may also facilitate internal reforming of hydrocarbon fuels. In SOFCs, for example, if nickel catalyst is disposed at an electrode (e.g., anode) to sustain the electrochemical reaction, the active nickel catalyst may also reform hydrocarbon fuel into hydrogen and carbon monoxide (CO). Moreover, both hydrogen and CO may be produced when reforming hydrocarbon feedstock. Thus, fuel cells, such as SOFCs, that can utilize CO as fuel (in addition to hydrogen) are generally more attractive candidates for utilizing reformed hydrocarbon and for internal and/or adjacent reforming of hydrocarbon fuel.

In general, high operating temperatures within the fuel cell and the presence of the byproduct steam generally promote internal or adjacent reforming of hydrocarbon. Advantageously, excess steam in the fuel cell may reduce the deposition of elemental carbon within the fuel cell and in adjacent reformers. On the whole, internal and/or adjacent reforming and their integration with the fuel cell operation may improve the efficiency and/or economics of the fuel cell operations.

Unfortunately, it is generally difficult to maintain a sufficiently high steam-to-carbon ratio in all regions of a fuel cell to prevent the formation of elemental carbon and the associated carbon deposition, especially if internal reforming is intended to occur on an electrode (e.g., anode) along with for example, the electrochemical reactions. The fuel cell region near the inlet is especially vulnerable to carbon formation. That is, the entering fuel to be internally steam reformed is starved for steam or liquid water ($H_2O$) due to the typical gradient of increasing $H_2O$ (e.g., steam) concentration from the inlet to the outlet of the fuel cell. The $H_2O$ concentration generally increases in the direction of fuel flow toward the exit, and therefore, excess $H_2O$ is generally present at the exit region of the fuel cell. Carbon is generally expected to form near the cell inlet because the $H_2O$ concentration is lowest at the inlet. Carbon deposition in the fuel cell can lead to poor heat/mass transfer, damage, and/or failure of the fuel cells.

Sustaining long term operation of fuel cells may be problematic due to accumulation of carbon deposits within the fuel cell. Such carbon deposits are typically relatively worse if fuel cells rely on carbon-based feedstocks instead of cleaner hydrogen-based feedstocks. Eventually, the fuel cell may need to be shut down or replaced, interrupting production of electricity and increasing maintenance costs of the fuel cell system, for example. Further, reformers or pre-reformers used for external reforming and/or adjacent reforming may also be subjected to significant carbon deposition. Therefore, these reformers are also generally shut down for regeneration (e.g., via steam), increasing operating and maintenance costs, and reducing the efficiency of the overall fuel cell system.

The anode unit of an SOFC typically electrochemically oxidizes at most 80% of fuel into reaction products, the remaining 20% passing unoxidized into the exhaust. The upper limit on utilization is due to high concentrations of reaction products which hinder the chemical reaction near the downstream end of the anode and can cause damage to the fuel cell material.

In view of the foregoing, there is a need to provide a technique that increases the fuel utilization of an SOFC. It would be further beneficial if the technique were to achieve separation of $CO_2$ from the fuel stream for sequestration or for expansion through a turbine, for example, to generate electric power thus increasing overall efficiency of the process.

BRIEF DESCRIPTION

An exemplary embodiment of the present invention comprises a fuel cell recirculation complex comprising:

a fuel cell comprising an anode configured to generate a hot anode exhaust stream, the anode comprising an inlet and an outlet;

a waste heat recovery cycle configured to generate power from cooling the hot anode;

a compressor configured to compress the exhaust gas cooled via the waste heat recovery cycle;

an expander configured to expand and cool the compressed exhaust gas; and a heat exchanger system configured to receive at least a portion of the expanded gas and to pre-cool the compressed waste heat recovery cycle exhaust gas prior to cooling via the expander, and further configured to remove by phase change water ($H_2O$) and carbon dioxide ($CO_2$) from the exhaust gas passing through the waste heat recovery cycle, and further configured to generate a stream of fuel that is returned to the inlet of the fuel cell anode with a higher molar concentration of carbon monoxide (CO) and hydrogen ($H_2$) fuel than was initially present in the fuel cell anode exhaust gas prior to entering the waste heat recovery cycle.

According to another embodiment, a fuel cell recirculation complex comprises:

a fuel cell comprising an anode configured to generate hot exhaust gas, the anode comprising an inlet and an outlet;

a waste heat recovery cycle configured to generate power from cooling the hot anode; and a heat exchanger system configured to remove by phase change water ($H_2O$) and carbon dioxide ($CO_2$) from the exhaust gas passing through the waste heat recovery cycle, and further configured to generate a stream of fuel that is returned to the inlet of the fuel cell anode with a higher molar concentration of carbon monoxide (CO) and hydrogen ($H_2$) fuel than was initially present in the fuel cell anode exhaust gas prior to entering the waste heat recovery cycle.

According to yet another embodiment, a fuel cell recirculation complex comprises:

a hydrocarbon fuel reforming system configured to generate carbon monoxide (CO) and hydrogen ($H_2$);

a water-gas shift reactor configured to convert the CO to carbon dioxide ($CO_2$);

a heat exchanger system configured to heat the $H_2$ and remove the $CO_2$ in solid form, liquid form, or both;

a fuel cell comprising an anode configured to generate hot exhaust gas in response to a stream of $H_2$ from the heat exchanger system, the anode comprising an inlet and an outlet; and a waste heat recovery cycle configured to generate power from cooling the hot anode.

According to still another embodiment, a fuel cell recirculation complex comprises:

a fuel cell comprising an anode configured to generate hot exhaust gas, the anode comprising an inlet and an outlet;

a hydrocarbon fuel reforming system configured to remove carbon from a hydrocarbon fuel and introduce the reformed fuel into the fuel cell recirculation complex downstream from the outlet of the fuel cell anode;

a waste heat recovery cycle configured to generate power from cooling the hot anode;

a compressor configured to compress the exhaust gas cooled via the waste heat recovery cycle;

an expander configured to expand and cool the compressed exhaust gas; and a heat exchanger system configured to receive at least a portion of the expanded gas and to pre-cool the compressed waste heat recovery cycle exhaust gas prior to cooling via the expander, and further configured to remove by phase change water ($H_2O$) and carbon dioxide ($CO_2$) from the exhaust gas passing through the waste heat recovery cycle, and further configured to generate a stream of fuel that is returned to the inlet of the fuel cell anode with a higher molar concentration of carbon monoxide (CO) and hydrogen ($H_2$) fuel than was initially present in the fuel cell anode exhaust gas prior to entering the waste heat recovery cycle.

DRAWINGS

The foregoing and other features, aspects and advantages of the invention are apparent from the following detailed description taken in conjunction with the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The embodiments described herein with reference to the Figures advantageously provide increased SOFC efficiencies with simultaneous carbon capture features. Other embodiments of the present invention are also contemplated, as noted in the discussion. The principles described herein can just as easily be applied for example, to comparable fuel-cell technologies that are not strictly solid-oxide fuel cells. A vast variety of waste heat recovery cycles and methods for integrating those cycles are also possible using the principles described herein.

Figure 1:
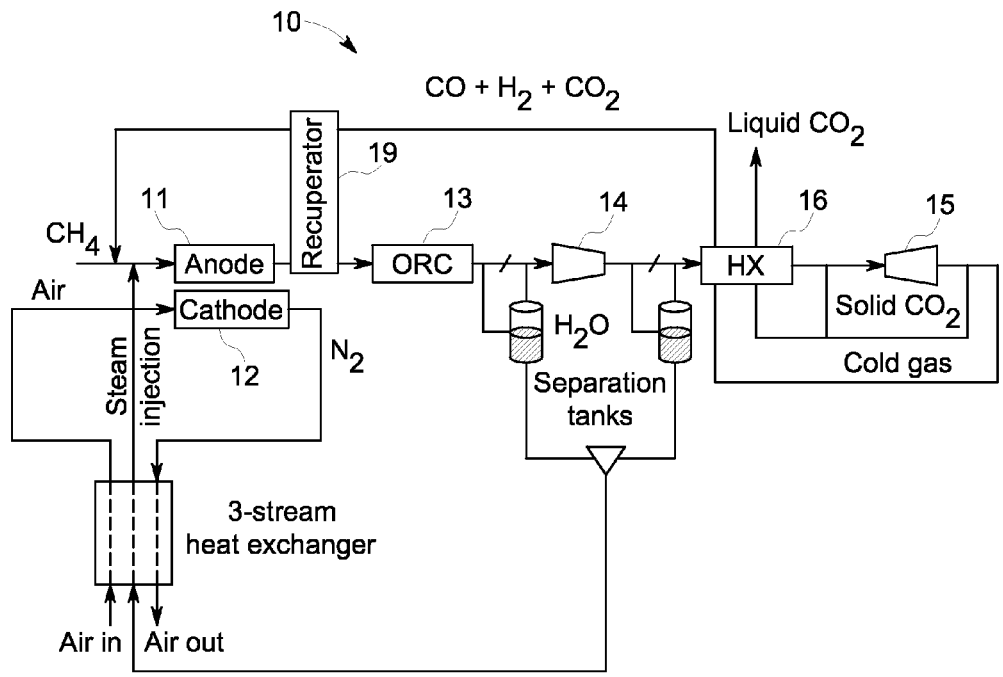
FIG. 1 is a simplified diagram illustrating a solid-oxide fuel cell (SOFC) recirculation complex according to one embodiment.

FIG. 1 is a simplified diagram illustrating a solid-oxide fuel cell (SOFC) recirculation complex 10 according to one embodiment. Recirculation complex 10 comprises an SOFC that includes an anode 11 and a cathode 12. Heat from the anode 11 exhaust drives a Rankine heat cycle referred to herein as Organic Rankine cycle (ORC) 13 to produce power. The ORC exhaust gas is applied to a compressor 14 that functions to compress the ORC exhaust gas subsequent to removal of some condensed water at near-ambient temperature and pressure, and prior to a further removal of condensed water by cooling the exhaust gas to ambient temperature at a high pressure. The compressed ORC exhaust gas is subsequently cooled further via an expander 15 and a pre-expansion cycle that employs for example, a heat exchanger 16. According to one aspect, the pre-expansion cycle operates through cooling of the compressed ORC exhaust gas stream by contact with the heat exchanger 16.

Figure 2:
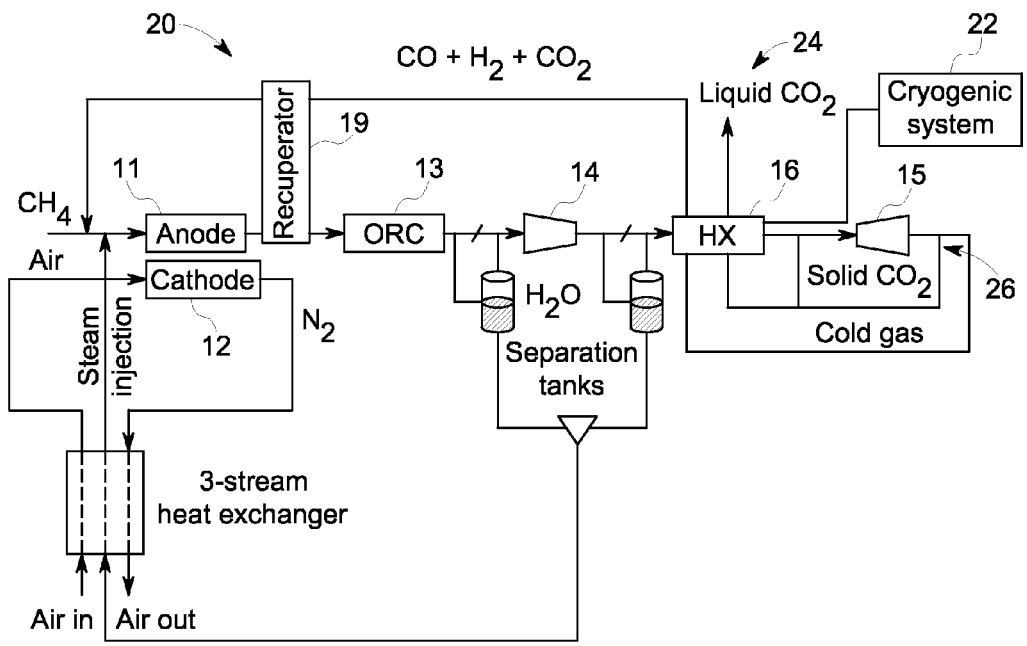
FIG. 2 is a simplified diagram illustrating a solid-oxide fuel cell (SOFC) recirculation complex according to another embodiment.

FIG. 2 is a simplified diagram illustrating a solid-oxide fuel cell (SOFC) recirculation complex 20 according to one embodiment. SOFC recirculation complex 20 is similar to SOFC recirculation complex 10, except SOFC recirculation complex 20 employs an electrically powered cooling unit 22 to further enhance cooling of the compressed ORC exhaust gas stream during the pre-expansion cycle.

The sub-ambient cooling of the compressed ORC exhaust gas stream advantageously allows some $CO_2$ to be removed from the flow, either as a liquid 24 at above-ambient pressure, or as a solid product 26 that is condensed out of the liquid phase at above-ambient pressure and below the melting temperature. According to one aspect, SOFC recirculation complex 20 employs an apparatus to collect solid $CO_2$ from the chilled exhaust gas downstream of the expander 15, which solidifies out of the gas phase directly at point 2-1a depicted in FIG. 1.

Subsequent to its contact with the heat exchanger 16 that raises its temperature some of the way toward the appropriate reaction temperature, the cooled, expanded, residual gas stream returns to the inlet of the anode 11 via a recuperator 19 with a higher molar concentration of $CO_2$ and $H_2$ fuel than was initially present in the anode exhaust. According to one aspect, part of the flow of water removed from the anode is warmed to the appropriate reaction temperature via the cathode 12 exhaust and then applied either to a separate reformer unit upstream of the anode 11 or to the anode 11 itself to generate the steam necessary for reforming the hydrocarbon fuel.

Figure 3:
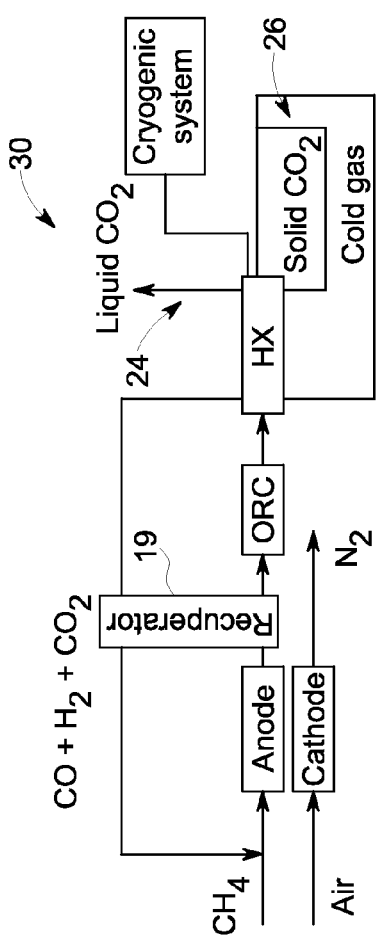
FIG. 3 is a simplified diagram illustrating a solid-oxide fuel cell (SOFC) recirculation complex according to yet another embodiment.

The embodiments 10, 20 depicted respectively in FIGS. 1 and 2 are not so limited; and it shall be understood that SOFC recirculation complex 10 and SOFC recirculation complex 20 can be implemented in the absence of a compression-expansion process purely via means of an electrically powered cooling unit such as that depicted in FIG. 3. FIG. 3 is a simplified diagram illustrating a solid-oxide fuel cell (SOFC) recirculation complex 30 according to one embodiment. The sub-ambient cooling of the compressed ORC exhaust gas stream advantageously allows some $CO_2$ to be removed from the flow, either as a liquid 24 at above-ambient pressure, or as a solid product 26 that is condensed out of the liquid phase at above-ambient pressure and below the melting temperature.

Figure 4:
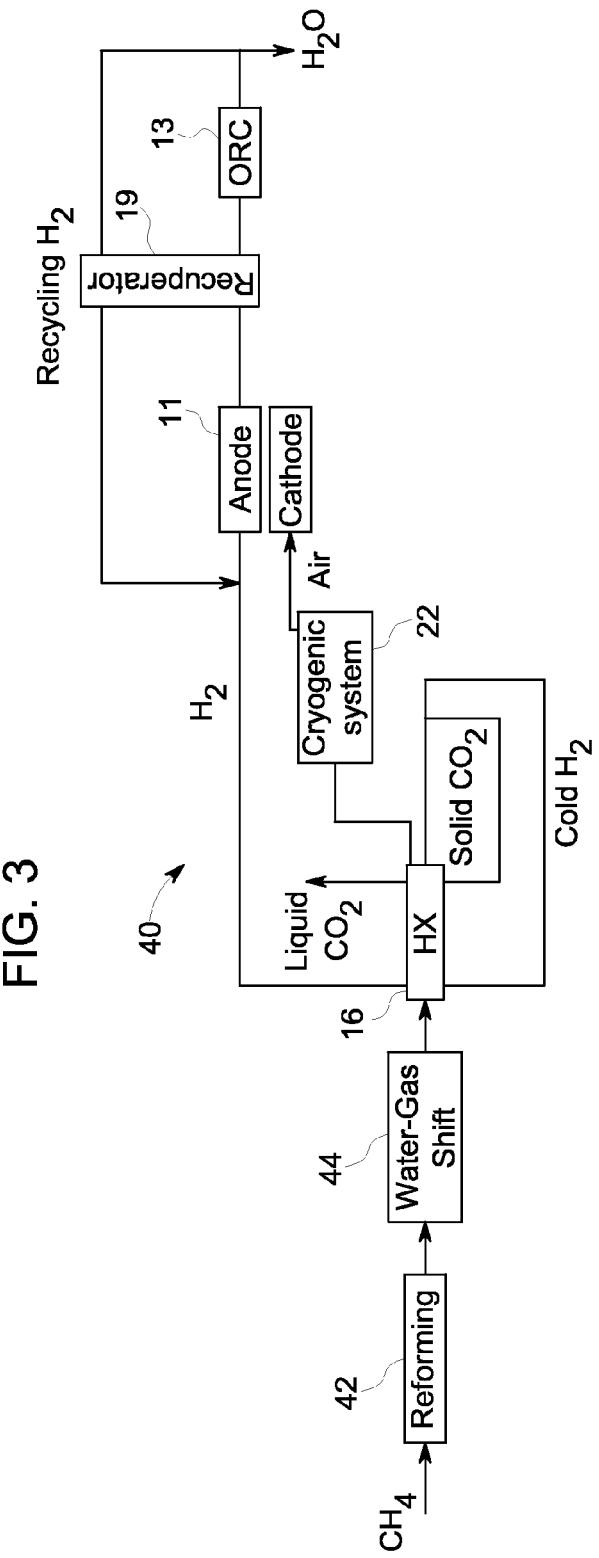
FIG. 4 is a simplified diagram illustrating a solid-oxide fuel cell (SOFC) recirculation complex according to still another embodiment.
Figure 5:
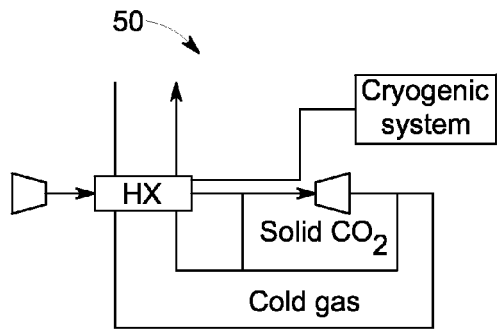
FIG. 5 is a simplified diagram illustrating a solid-oxide fuel cell (SOFC) recirculation complex according to still another embodiment.

FIG. 4 is a simplified diagram illustrating a solid-oxide fuel cell (SOFC) recirculation complex 40 according to one embodiment. In this embodiment, the hydrocarbon fuel ($CH_4$) is reformed via reforming apparatus 42 to CO and $H_2$ prior to entering the SOFC anode 11. The CO is subsequently converted to $CO_2$ by means of a water-gas shift apparatus 44 at point 3-1a depicted in FIG. 4. The resultant $CO_2$ is then removed in solid or liquid form either by means of a compression-expansion process 50 such as depicted in FIG. 5, or by means of an electrically powered cooling unit 22 such as depicted in FIG. 4, or both. The residual $H_2$ fraction then proceeds to the anode 11 after recovering heat through a recuperator/heat exchanger 16 at point 3-1b depicted in FIG. 4. According to one aspect, any $H_2$ remaining in the anode exhaust may be recycled back to the anode inlet at point 3-1c depicted in FIG. 4 after passing through a recuperator 19 sufficient to raise its temperature to the appropriate reaction temperature. According to one embodiment, a Rankine cycle 13 may be deployed downstream of the anode exhaust at point 3-1d depicted in FIG. 4, producing electricity or shaft power from the anode exhaust heat.

Figure 6:
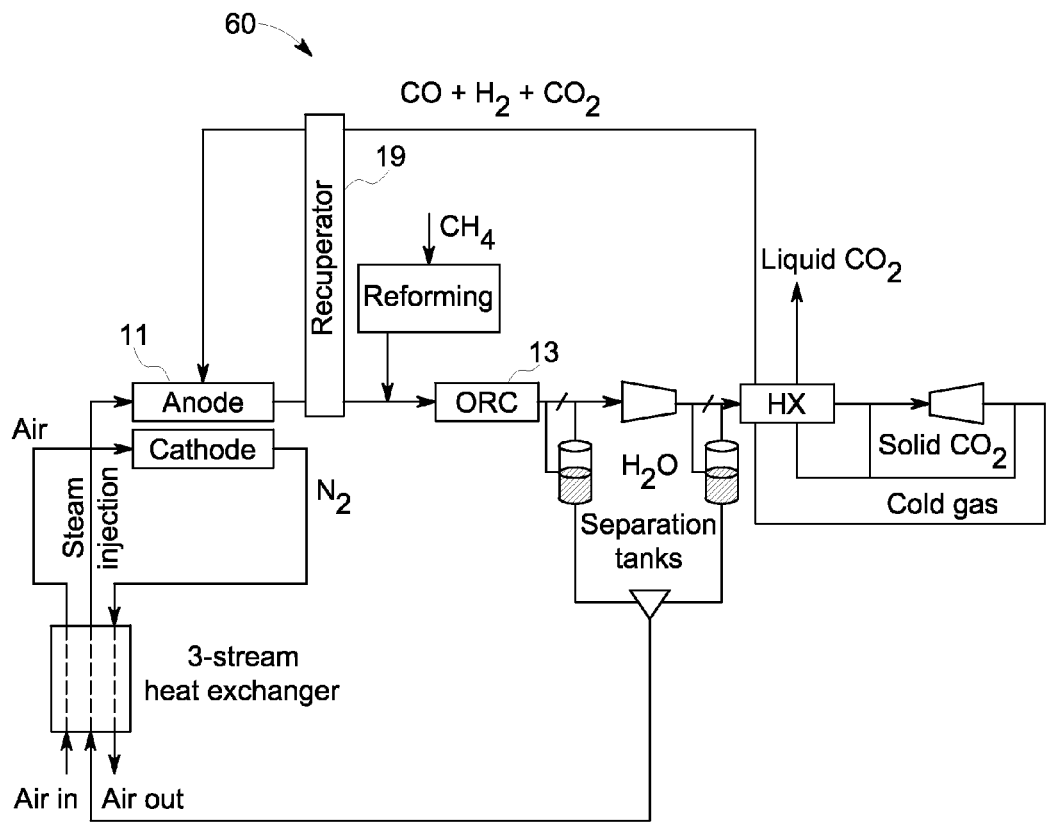
FIG. 6 is a simplified diagram illustrating a solid-oxide fuel cell (SOFC) recirculation complex according to still another embodiment.

FIG. 6 is a simplified diagram illustrating a solid-oxide fuel cell (SOFC) recirculation complex 60 according to one embodiment. SOFC recirculation complex 60 functions in similar fashion to that described herein for SOFC recirculation complex 10 or SOFC recirculation complex 20, except that the fuel ($CH_4$), after being reformed at point 4-1a depicted in FIG. 6, may be introduced downstream of the anode at point 4-1b depicted in FIG. 6 in order to prevent carbonization within the anode 11. According to one embodiment, reforming of the fuel is achieved using a process/structure such as that depicted in FIG. 4 to deliver a residual $H_2$ fraction to the ORC 13.

In summary explanation, systems and methods for boosting the overall performance of a solid-oxide fuel cell (SOFC) while simultaneously separating a nearly pure stream of $CO_2$ for sequestration or for use in generating electrical power to further increase overall efficiency of the process have been described herein. The systems and methods advantageously increase the SOFC efficiency to greater than 50% with simultaneous carbon capture. Particular embodiments using the principles herein result in a solid-oxide fuel cell efficiency up to and greater than 60%.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A fuel cell recirculation complex comprising:
a fuel cell comprising an anode configured to generate a hot anode exhaust stream, the anode comprising an inlet and an outlet;
a waste heat recovery cycle configured to generate power from cooling the hot anode exhaust stream;
a compressor configured to compress the exhaust gas cooled via the waste heat recovery cycle;
an expander configured to expand and cool the compressed exhaust gas; and
a heat exchanger system configured to receive at least a portion of the expanded gas and to pre-cool the compressed waste heat recovery cycle exhaust gas prior to cooling via the expander, and further configured to remove by phase change water (H2O) and carbon dioxide (CO2) from the exhaust gas passing through the waste heat recovery cycle, and further configured to generate a stream of fuel that is returned to the inlet of the fuel cell anode with a higher molar concentration of carbon monoxide (CO) and hydrogen (H2) fuel than was initially present in the fuel cell anode exhaust gas prior to entering the waste heat recovery cycle.

2. The fuel cell recirculation complex wherein the fuel cell comprises a solid-oxide fuel cell.

3. The fuel cell recirculation complex wherein the waste heat recovery cycle comprises an Organic Rankine cycle.

4. The fuel cell recirculation complex according to claim 1, wherein the heat exchanger system and expander together are configured to remove CO2 in solid form condensed from the expanded gas generated via the expander, in liquid form condensed from the stream of fuel generated via the heat exchanger system prior to returning the stream of fuel to the inlet of the fuel cell, or both.

5. The fuel cell recirculation complex according to claim 1, further comprising an electrically powered cooling unit configured to further cool the compressed waste heat recovery cycle exhaust gas passing through the heat exchanger system.

6. The fuel cell recirculation complex according to claim 5, wherein the electrically powered cooling unit and heat exchanger system are together configured to remove CO2 in solid form condensed from the stream of fuel generated via the heat exchanger system prior to returning the stream of fuel to the inlet of the fuel cell, in liquid form condensed from the stream of fuel generated via the heat exchanger system prior to returning the stream of fuel to the inlet of the fuel cell, or both.

7. The fuel cell recirculation complex according to claim 1, wherein the fuel cell, waste heat recovery cycle, compressor, expander and heat exchanger system together provide a fuel cell operating at greater than about 50% efficiency.

8. The fuel cell recirculation complex according to claim 1, wherein the fuel cell further comprises a cathode configured to generate supplemental heat driving the waste heat recovery cycle such that the power generated via the waste heat recovery cycle is greater than the power generated via the waste heat recovery cycle in response to solely cooling the hot anode.

* * * * *